(12) United States Patent
Aonuma

(10) Patent No.: US 7,170,621 B2
(45) Date of Patent: Jan. 30, 2007

(54) AUTOMATIC IMAGE DATA TRANSFER SYSTEM

(75) Inventor: Masashi Aonuma, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1337 days.

(21) Appl. No.: 09/989,374

(22) Filed: Nov. 21, 2001

(65) Prior Publication Data

US 2002/0122211 A1 Sep. 5, 2002

(30) Foreign Application Priority Data

Nov. 22, 2000 (JP) ............... 2000-356160

(51) Int. Cl.
*H04N 1/21* (2006.01)
(52) U.S. Cl. ............ 358/1.15; 358/1.1; 358/302; 382/132
(58) Field of Classification Search .......... 358/1.1, 358/1.15, 527, 296, 302; 382/128, 132
See application file for complete search history.

(56) References Cited

U.S. PATENT DOCUMENTS

| 4,258,264 A | 3/1981 | Kotera et al. ............... 250/484 |
| 4,346,295 A | 8/1982 | Tanaka et al. ............ 250/327.2 |
| 4,485,302 A | 11/1984 | Tanaka et al. ............ 250/327.2 |
| 4,739,480 A | 4/1988 | Oono et al. |
| 5,335,172 A | 8/1994 | Matsumoto et al. |
| 5,546,473 A * | 8/1996 | Buytaert et al. ............ 382/132 |
| 6,370,229 B1 * | 4/2002 | Tsuchino et al. ........... 378/165 |

FOREIGN PATENT DOCUMENTS

| JP | 55-12429 | 1/1980 |
| JP | 56-11395 | 2/1981 |

OTHER PUBLICATIONS

Japanese Abstract No. 01227139 dated Sep. 11, 1989.
Japanese Abstract No. 04155581 dated May 28, 1992.
Japanese Abstract 56011395.

* cited by examiner

*Primary Examiner*—Thomas D. Lee
(74) *Attorney, Agent, or Firm*—Sughrue Mion, PLLC

(57) ABSTRACT

A system is provided that enables images read by an image data reading apparatus 10 shared by photographing apparatuses 2A~2D to be confirmed without confusion. Information registration terminals 3A~3D for registering sheet identification information I in relation to patient information K are installed together with corresponding monitors 4A~4D, for the respective photographing apparatuses 2A~2D. The terminals, the monitors and the image data reading apparatus 10 are connected to a network 15. One of the terminals 3A registers the patient information K and the identification information I of a sheet used for photographing by the corresponding photographing apparatus 2A, and the image data reading apparatus 10 reads image data S from the sheet. The image data S are transferred automatically to the monitor 4A corresponding to the terminal 3A that registered the information, and a visible image of the image data S is displayed on the corresponding monitor 4A.

4 Claims, 3 Drawing Sheets

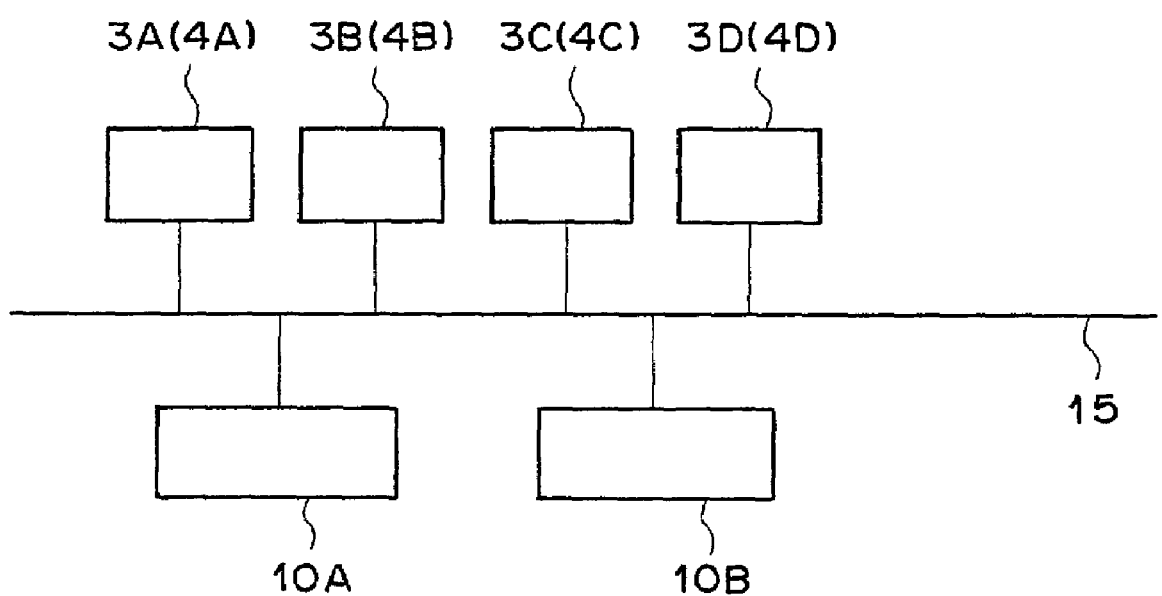

AUTOMATIC IMAGE DATA TRANSFER SYSTEM

BACKGROUND OF THE INVENTION

1. Field of the Invention

The present invention relates to an automatic image data transfer system. More specifically, the present invention relates to an automatic image data transfer system having a network comprising identification information registration terminals for registering identification information of sheets on which images are or were recorded and an image data reading apparatus for reading image data from the sheets.

2. Description of the Related Art

Radiation image recording/reproducing systems using stimulable phosphor have been known (Japanese Unexamined Patent Publication Nos. 55(1980)-12429, 56(1981)-11395, and 56(1981)-11397, for example). Stimulable phosphor stores a portion of energy of radiation (such as X-rays, $\alpha$ rays, $\beta$ rays, $\gamma$ rays, electron rays, and ultraviolet rays) irradiated thereon and emits a phosphorescent light in accordance with the stored radiation energy upon exposure to an excitation light such as a visible light. In a radiation image recording/reproducing system, radiation image information of a subject such as a human body is recorded in a stimulable phosphor sheet having a stimulable phosphor layer, and the excitation light such as a laser beam is irradiated on the sheet to have the sheet to emit the phosphorescent light. The phosphorescent light is photoelectrically read to obtain an image signal, and a radiation image of the subject based on the image signal is output as a visible image on a recording medium such as a photosensitive material or on a display device such as a CRT display unit.

In such a radiation image recording/reproducing system, a photographing apparatus for recording a radiation image on a stimulable phosphor sheet and an image data reading apparatus for reading image data from the sheet having the radiation image recorded therein may be installed in separate housings.

In a large-scale or medium-scale hospital, it is often the case that a plurality of photographing rooms is used and each of the rooms has a radiation image photographing apparatus. However, the number of reading apparatuses for reading image data from sheets having radiation images of patients is generally less than the number of the photographing apparatuses, since the reading apparatuses are expensive. Therefore, a sheet after photographing is brought from one of the photographing rooms (photographing apparatuses) to the closest reading apparatus for image data reading. A visible image represented by the image data that have been read is displayed on a monitor installed together with the reading apparatus or on a monitor for centralized management. In this manner, a state of the image is confirmed. In other words, images photographed by the plurality of photographing apparatuses are confirmed by using only one monitor.

However, confirmation of the images photographed by the photographing apparatuses on only one monitor may cause confusion regarding which image has been photographed in which room, since the images photographed in the rooms (apparatuses) are collectively managed on the monitor. Furthermore, in the case where a plurality of radiological technicians is respectively in charge of the photographing rooms, the radiological technicians may confuse the images of that he or she is responsible for.

SUMMARY OF THE INVENTION

The present invention has been conceived based on consideration of the above problems. An object of the present invention is therefore to provide an automatic image data transfer system for enabling confirmation of images photographed by a plurality of photographing apparatuses without confusion.

An automatic image data transfer system of the present invention is a system comprising a plurality of identification information registration terminals, a plurality of image display means respectively corresponding to the identification information registration terminals, and an image data reading apparatus. The identification information registration terminals, the image display means, and the image data reading apparatus are all connected by a network. The identification information registration terminals respectively correspond to a plurality of photographing apparatuses, and each of the photographing apparatuses records an image of a subject on a predetermined sheet. Each of the identification information registration terminals registers identification information of the sheet used by the photographing apparatus corresponding thereto. The image data reading apparatus reads image data representing the image from the sheet after the sheet having the image recorded therein is set in the reading apparatus. The automatic image data transfer system is characterized by that the image data reading apparatus automatically transfers the image data read from the sheet to the image display means corresponding to the identification information registration terminal which registered the identification information of the sheet.

Each pair of the identification information registration terminal and the image display means corresponding thereto may be installed either in separate housings or in one housing.

The image data reading apparatus reads the identification information attached to the sheet set therein, and inquires each of the identification information registration terminals about whether or not the terminal registered the identification information of the sheet. In response to a reply from the terminal that registered the identification information, the image data reading apparatus transfers the image data to the image display means corresponding to the terminal that registered the identification information.

Furthermore, the image data reading apparatus may read the identification information attached to the sheet set therein and inquires a predetermined one of the terminals about which of the terminals registered the identification information. In response to a reply from the predetermined terminal, the reading apparatus transfers the image data to the image display means corresponding to the terminal that registered the identification information. In the case where the predetermined terminal registered the identification information, the predetermined terminal replies to the image data reading apparatus with this fact. In the case where the predetermined terminal is not the terminal that registered the identification information, the predetermined terminal inquires the other terminals about which of the terminals registered the identification information, and replies to the image data reading apparatus which of the terminals registered the information, in response to a reply from the terminal that registered the identification information.

In the automatic image data transfer system of the present invention, each of the identification information registration terminals preferably registers information regarding the subject and relates the information on the subject with the identification information regarding the sheet in which the image of the subject is recorded.

According to the automatic image data transfer system of the present invention, the image data recorded in the sheet by each of the photographing apparatuses is read by the image data reading apparatus, and the image data are automatically transferred to the image display means corresponding to the identification information registration terminal that registered the identification information regarding the sheet. Therefore, the image data can be confirmed on the image display means corresponding to the terminal that registered the information, that is, on the image display means corresponding to the photographing apparatus that used the sheet. In this manner, confusion caused by collective management of images photographed by the plurality of photographing apparatuses can be prevented, which is convenient for radiological technicians.

BRIEF DESCRIPTION OF THE DRAWINGS

FIG. 6 is a diagram showing a configuration of another embodiment of the image data transfer system of the present invention.

DESCRIPTION OF THE PREFERRED EMBODIMENTS

Figure 1:
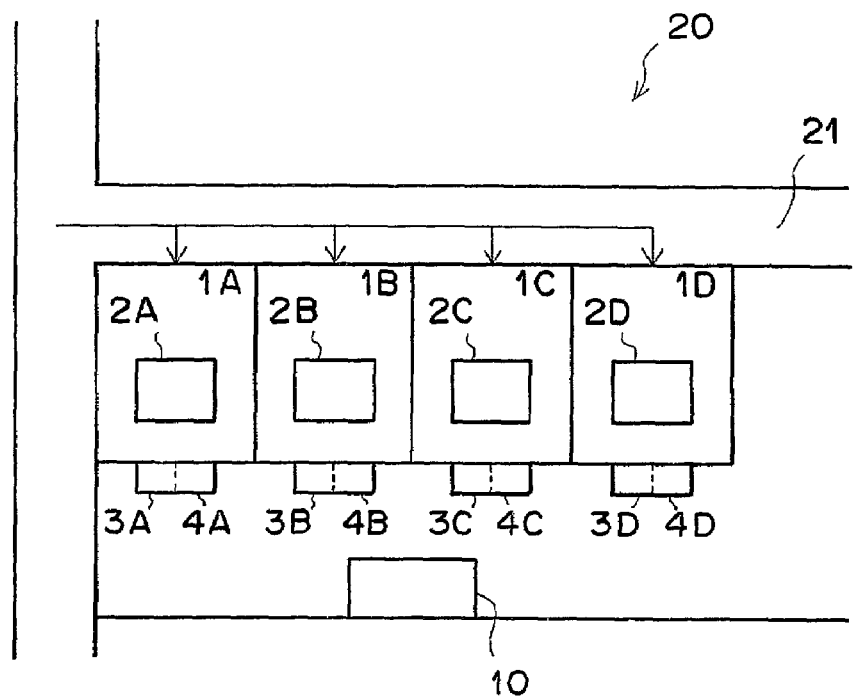
FIG. 1 is a diagram showing a layout of apparatuses in a CR system.
Figure 2:
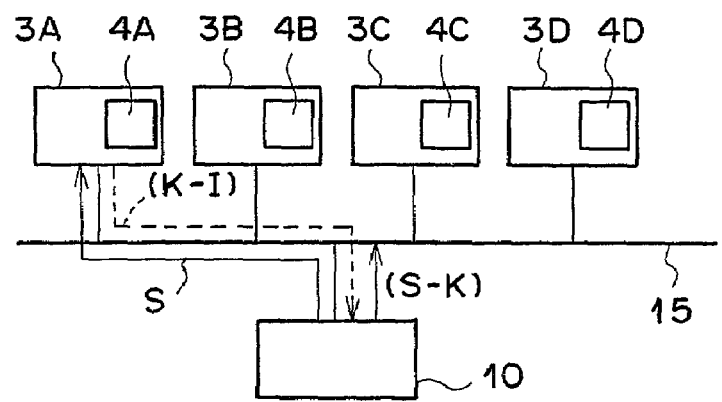
FIG. 2 is a diagram showing a configuration of an embodiment of an image data transfer system of the present invention in the CR system.
Figure 3:
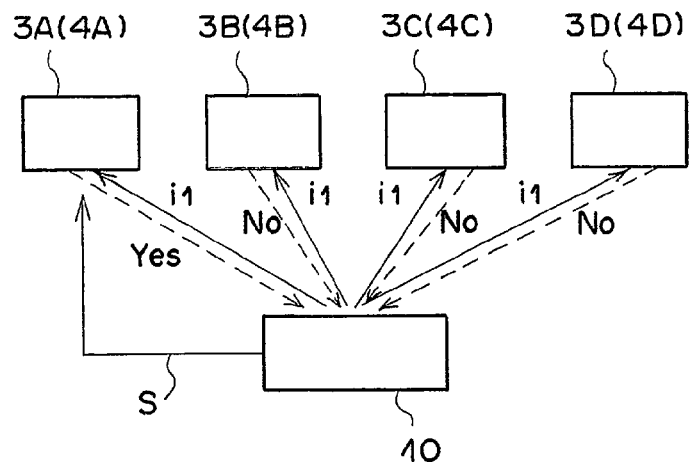
FIG. 3 is a diagram showing how image data are transferred in the image data transfer system.
Figure 4:
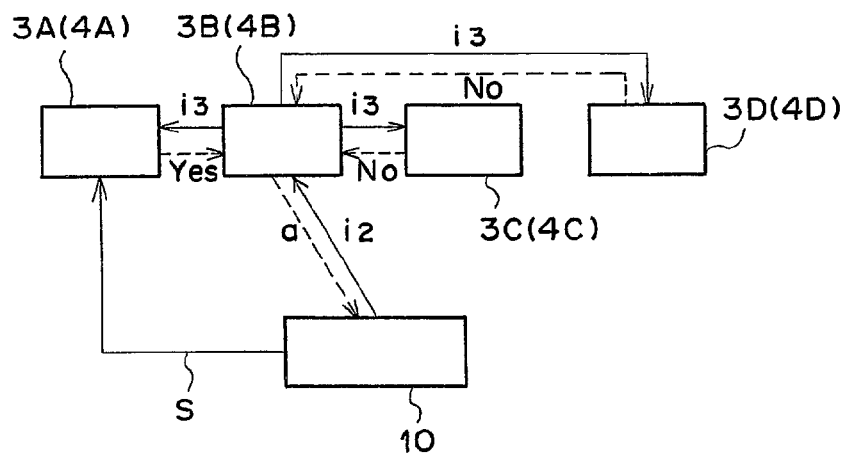
FIG. 4 is another diagram showing how the image data are transferred in the image data transfer system.
Figure 5:
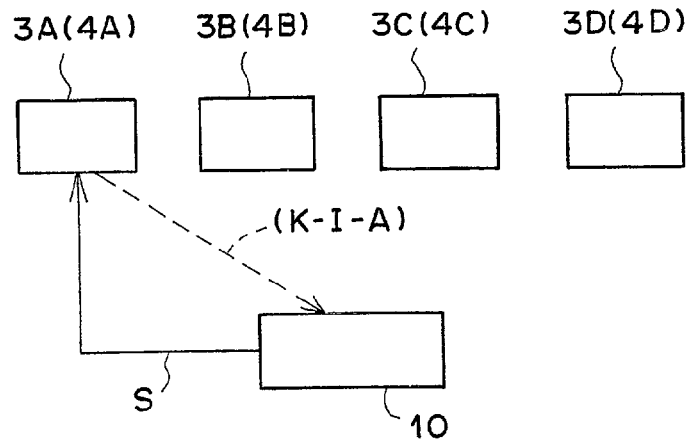
FIG. 5 is still another diagram showing how the image data are transferred in the image data transfer system.

Hereinafter, embodiments of the present invention will be explained with reference to the accompanying drawings. FIG. 1 shows a layout of a CR (Computed Radiography) system used in a hospital. The CR system records a radiation image in a stimulable phosphor sheet and obtains an image signal (image data) by photoelectric conversion of a phosphorescent light emitted and read from the sheet upon scanning of the sheet with an excitation light. FIG. 2 is a diagram showing a configuration of an image data transfer system of the present invention, and FIGS. 3 to 5 show how the image data are transferred in the image data transfer system.

As shown in FIG. 1, a hospital 20 has four photographing rooms 1A to 1D facing a corridor 21, and photographing apparatuses 2A to 2D are respectively placed in the photographing rooms. Each of the photographing apparatuses 2A to 2D records a radiation image of a subject, that is, a radiation image of a predetermined portion of a patient's body, in a stimulable phosphor sheet. In the photographing rooms, information registration terminals 3A to 3D are respectively placed in combination with monitors 4A to 4D corresponding to the respective terminals as image display means for image confirmation. Each of the information registration terminals registers patient information and a bar code used as sheet identification information attached to the sheet. The monitors 4A to 4D may be installed separately from the corresponding information registration terminals 3A to 3D, or used as the monitors attached to the corresponding terminals. In this example, the monitors 4A to 4D are respectively attached to the information registration terminals 3A to 3D. An image data reading apparatus 10 is placed outside the photographing rooms 1A to 1D in a separate corridor. The image data reading apparatus 10 accepts the sheet after photographing by any one of the photographing apparatuses 2A to 2D, and scans the sheet with the excitation light to obtain the image data by photoelectric conversion of the phosphorescent light emitted and read from the sheet upon scanning. As has been described above, the CR system therefore comprises the photographing apparatuses 2A to 2D, the information registration terminals 3A to 3D, the monitors 4A to 4D, and the image data reading apparatus 10.

In the CR system shown in FIG. 1, the information registration terminals 3A to 3D in the photographing rooms 1A to 1D and the monitors 4A to 4D attached thereto are connected to the image data reading apparatus 10 via a network 15 as shown in FIG. 2, and comprise the image data transfer system of the present invention. An image processing apparatus and an image output apparatus that are not shown are also connected to the network 15, and the image data obtained by the image data reading apparatus 10 are appropriately transferred to the image processing apparatus and the image output apparatus.

The operation in this embodiment will be explained next.

A patient enters one of the photographing rooms along one of arrows shown in FIG. 1. Meanwhile, a radiological technician registers, with the information registration terminal therein, patient information K of the patient as a subject and identification information I of the stimulable phosphor sheet in which the radiation image of the patient is recorded. In this example, photographing is carried out by using the photographing apparatus 2A in the photographing room 1A, and the patient information K and the identification information I is registered with the information registration terminal 3A corresponding to the photographing apparatus 2A. The patient information K may be registered by being input from a keyboard, or by being read from a patient ID card. The identification information I is registered by reading the bar code attached to the sheet. The patient information K is related to the identification information I and the information (K-I) is transferred to the image data reading apparatus 10.

The radiation image is photographed by setting the sheet in the photographing apparatus 2A. The radiation image may be photographed before or after the registration of the information. Therefore, in this example, the patient information K and the identification information I of the sheet having the radiation image recorded therein may be registered with the registration terminal 3A after the radiation image is photographed. A photographing condition for the body portion may also be registered together with the patient information K, for example.

After the photographing, the radiological technician takes out the sheet from the photographing apparatus 2A and sets the sheet in the image data reading apparatus 10. The sheet may be inserted into the reading apparatus 10 together with a cassette storing the sheet therein.

The image data reading apparatus 10 reads image data S representing the image recorded in the sheet. At this time, the reading apparatus 10 recognizes the identification information I of the sheet by reading the bar code attached to the sheet. The image data S read from the sheet are stored while being linked to the patient information K, based on the patient information K and the identification information I transferred from the information registration terminal 3A.

As shown in FIG. 3, the image data reading apparatus 10 sends an inquiry $i_1$ to each of the information registration terminals 3A to 3D about whether or not the terminal registered the identification information I, in order to transfer the image data S to the monitor corresponding to the information registration terminal which registered the identification information I.

Each of the information registration terminals 3A to 3D sends a reply to the reading apparatus 10, in response to the inquiry $i_1$ from the reading apparatus 10.

The reading apparatus 10 receives the replies from the terminals 3A to 3D, and recognizes that the identification information I was registered with the terminal 3A, based on the replies indicating that the terminal 3A registered the information I while the other terminals 3B to 3D did not. The reading apparatus 10 then transfers the image data S to the monitor 4A of the terminal 3A.

A visible image of the image data S is displayed on the monitor 4A, and the radiological technician confirms the image. In other words, the radiological technician can confirm the image represented by the image data S on the monitor 4A installed corresponding to the photographing apparatus 2A by which the radiation image represented by the image data S was photographed.

If the radiological technician judges the image is appropriate as a result of confirmation, the image data S stored in the reading apparatus 10 and the patient information K are transferred together to the image processing apparatus (not shown). In the case where the image is not appropriate, photographing is carried out again, for example.

In the above example, the image data reading apparatus 10 inquires the terminals 3A to 3D about the identification information I that has been read. However, the reading apparatus 10 may inquire one of the terminals, which has been predetermined, so that the predetermined terminal can further inquire the other terminals about the identification information.

In this case, the image data reading apparatus 10 has been set to inquire the predetermined terminal 3B, for example, as shown in FIG. 4. The image data reading apparatus 10 sends an inquiry $i_2$ to the terminal 3B about which of the terminals registered the identification information I regarding the sheet from which the image data S have been read.

If the identification information was registered with the terminal 3B, the terminal 3B replies to the reading apparatus 10 with information to this effect. Otherwise, the terminal 3B sends an inquiry $i_3$ to the other terminals 3A, 3C, and 3D about which of the terminals registered the identification information I.

The terminals 3A, 3C, and 3D respectively reply to the terminal 3B whether or not the terminal registered the identification information, in response to the inquiry $i_3$ from the terminal 3B. In this example, the terminal 3A registered the identification information I, and the terminal 3A sends to the terminal 3B the reply that it has registered the information.

In response to the replies, the terminal 3B sends to the image data reading apparatus 10 a reply "a" shown in FIG. 4 indicating that the identification information I was registered with the terminal 3A.

The reading apparatus 10 receives the reply "a" and recognizes that the information I was registered with the terminal 3A. The reading apparatus 10 then sends the image data S to the monitor 4A of the terminal 3A.

As has been described above, the visible image of the image data S can be displayed on the monitor 4A.

The reading apparatus 10 may also recognize which of the terminals has registered the identification information I without inquiring any of the terminals.

In this case, the terminals 3A to 3D transfer identifiers (such as addresses) of the respective terminals to the image data reading apparatus 10 when the respective terminals send to the image data reading apparatus 10 the information (K-I) having the patient information K and the identification information I, which are related to each other, as shown in FIG. 5. In this example, the terminal 3A sends to the reading apparatus 10 a self-identifier A in relation to the identification information I and the patient information K. The image data reading apparatus 10 recognizes that the identification information I was registered with the terminal 3A, based on the identification information I of the sheet from which the image data s have been read and the self-identifier A of the terminal 3A in relation to the identification information I transferred from the terminal 3A.

As has been described above, the image data reading apparatus 10 can recognize that the terminal 3A registered the identification information I without inquiring any one of the terminals, and transfers the image data S to the monitor 4A corresponding to the terminal 3A to display the visible image represented by the image data S.

In the above embodiment, the number of the reading apparatus 10 is one. However, the number of image data reading apparatuses connected to the network may be more than one, and the image data can be transferred from the respective reading apparatus as in the above example.

In other words, as shown in FIG. 6, image data reading apparatuses 10A and 10B may be connected to a network 15. Either of the image data reading apparatus may read image data from a sheet in which the image data have been recorded by any one of photographing apparatuses, and the reading apparatus that has read the image data from the sheet recognizes one of terminals that registered sheet identification information by using any one of the methods described above. In this manner, the image data are transferred to a monitor corresponding to the terminal that registered the identification information.

In the above embodiment, the stimulable phosphor sheet is used as the sheet in which the image is recorded. However, the sheet is not limited to the stimulable phosphor sheet in the present invention, and any sheet that records or has recorded an image therein can be used in the present invention.

What is claimed is:

1. An automatic image data transfer system comprising:
a plurality of identification information registration terminals respectively corresponding to a plurality of photographing apparatuses each of which records an image of a subject on a predetermined sheet, each of the identification information registration terminals registering identification information of the sheet used by a corresponding one of the photographing apparatuses;
a plurality of image display means respectively corresponding to the identification information registration terminals; and
an image data reading apparatus for reading image data representing the image from the sheet after the sheet having the radiation image recorded therein is set in the reading apparatus;
the identification information registration terminals, the image display means, and the image data reading apparatus being connected by a network, wherein the image data reading apparatus automatically transfers the image data read from the sheet to the one image display means among the plurality of image display means corresponding to the identification information registration terminal which registered the identification information of the sheet.

2. An automatic image data transfer system as defined in claim 1, wherein the image data reading apparatus reads the identification information attached to the sheet set therein, then inquires each of the identification information registration terminals about whether or not the identification information registration terminal registered the identification information regarding the sheet, and transfers the image data to the one image display means corresponding to the terminal that registered the identification information, in response to a reply from the terminal that registered the identification information.

3. An automatic image data transfer system as defined in claim 1, wherein the image data reading apparatus reads the identification information attached to the sheet set therein, then inquires a predetermined one of the identification information registration terminals about which of the terminals registered the identification information, and transfers the image data to the one image display means corresponding to the terminal that registered the identification information in response to a reply from the predetermined terminal, wherein in the case where the predetermined terminal registered the identification information, the predetermined terminal replies to the image data reading apparatus that the predetermined terminal registered the identification information, and in the case where the predetermined terminal is not the terminal that registered the identification information, the predetermined terminal inquires the other terminals about which of the terminals registered the identification information and replies to the image data reading apparatus which of the terminals registered the identification information in response to a reply from the terminal that registered the identification information.

4. An automatic image data transfer system as defined in any one of claims 1 to 3, wherein each of the identification information registration terminals registers information regarding the subject and relates the information regarding the subject with the identification information regarding the sheet in which the image of the subject is recorded.

* * * * *